US006989192B2

(12) United States Patent
Husemann et al.

(10) Patent No.: US 6,989,192 B2
(45) Date of Patent: Jan. 24, 2006

(54) PRESSURE SENSITIVELY ADHESIVE POLYACRYLATES

(75) Inventors: Marc Husemann, Hamburg (DE); Stephan Zöllner, Hamburg (DE)

(73) Assignee: tesa AG, Hamburg (DE)

( * ) Notice: Subject to any disclaimer, the term of this patent is extended or adjusted under 35 U.S.C. 154(b) by 299 days.

(21) Appl. No.: 10/166,447

(22) Filed: Jun. 10, 2002

(65) Prior Publication Data

US 2003/0068492 A1   Apr. 10, 2003

(30) Foreign Application Priority Data

Oct. 2, 2001   (DE) ................................ 101 48 731

(51) Int. Cl.
    B32B 5/16   (2006.01)
    B32B 27/00  (2006.01)
    C08L 31/02  (2006.01)
    C08L 51/00  (2006.01)

(52) U.S. Cl. .......................... 428/355 AC; 428/402.24; 428/407; 523/202; 523/205; 523/206; 525/78; 525/80

(58) Field of Classification Search ........ 428/355 AC, 428/402.2, 407; 525/203, 204, 209, 212, 525/217, 219, 231, 72, 73, 76, 77, 78, 79, 525/213, 214; 523/206, 202, 205
See application file for complete search history.

(56) References Cited

U.S. PATENT DOCUMENTS

| 3,661,618 | A |   | 5/1972  | Brookman et al. ........... 117/62 |
| 3,857,731 | A |   | 12/1974 | Merrill, Jr. et al. ......... 117/122 |
| 4,049,483 | A |   | 9/1977  | Loder et al. ................ 156/230 |
| 4,166,152 | A |   | 8/1979  | Baker et al. ................ 428/522 |
| 4,223,067 | A |   | 9/1980  | Levens ....................... 428/308 |
| 4,735,837 | A |   | 4/1988  | Miyasaka et al. ............. 428/40 |
| 4,810,763 | A |   | 3/1989  | Mallya et al. ............... 526/203 |
| 5,441,810 | A |   | 8/1995  | Aizawa et al. ............... 428/354 |
| 5,510,443 | A |   | 4/1996  | Shaffer et al. ............... 528/45 |
| 5,625,006 | A | * | 4/1997  | Callahan et al. ............. 525/301 |
| 5,877,261 | A |   | 3/1999  | Harder et al. ............... 525/123 |
| 6,114,493 | A |   | 9/2000  | Scialdone ................... 528/220 |
| 6,147,159 | A |   | 11/2000 | Hu et al. ..................... 525/106 |
| 6,168,913 | B1|   | 1/2001  | Hochlowski et al. ........... 435/4 |
| 6,417,267 | B1| * | 7/2002  | Stockl et al. ................ 524/808 |

FOREIGN PATENT DOCUMENTS

| DE | 690 21 669 T2 | 2/1996 |
| DE | 195 24 250 A1 | 1/1997 |
| DE | 692 11 134 T2 | 1/1997 |
| DE | 694 05 764 T2 | 1/1998 |
| DE | 100 29 553 A1 | 1/2002 |
| EP | 0 413 809 B1  | 8/1995 |
| EP | 0 590 039 B1  | 5/1996 |
| EP | 0 711 448 B1  | 9/1997 |
| GB | 1143424       | 2/1969 |
| JP | 07-331219     | * 12/1995 |
| NL | 6 606 711     | 11/1966 |
| NL | 7 009 629     | 1/1971 |

OTHER PUBLICATIONS

Abstract and machine translation, JP 07-331219, Miyashita, Dec. 19, 1995.*

* cited by examiner

Primary Examiner—Randy Gulakowski
Assistant Examiner—Timothy J. Kugel
(74) Attorney, Agent, or Firm—Norris McLaughlin & Marcus PA

(57) ABSTRACT

A pressure sensitively adhesive polyacrylate according to a composition known per se, characterized by crosslinked and functionalized polymer particles which on the basis of their chemical nature are suitable for assisting a crosslinking reaction of the pressure sensitive adhesive.

16 Claims, No Drawings

PRESSURE SENSITIVELY ADHESIVE POLYACRYLATES

The invention relates to a pressure sensitively adhesive polyacrylate and to a process for preparing a crosslinked pressure sensitive adhesive (PSA) based on polyacrylates which makes use of the inventive pressure sensitively adhesive polyacrylate.

For industrial PSA tape applications it is very common to use polyacrylate PSAs. Polyacrylates possess a variety of advantages over other elastomers. They are very stable toward UV light, oxygen, and ozone. Synthetic and natural rubber adhesives generally contain double bonds, so making them unstable toward the aforementioned environmental influences. A further advantage of polyacrylates is their transparency and their serviceability within a relatively wide temperature range.

Polyacrylate PSAs are generally prepared in solution by free radical polymerization. The polyacrylates are generally applied to the corresponding backing material from solution using a coating bar, and then dried. To increase the cohesion the polymer is crosslinked. Curing proceeds thermally or by UV crosslinking or by EB curing. The process described is relatively cost intensive and environmentally objectionable, since the solvent is not recycled.

Moreover, it is very difficult to produce PSA tapes coated at high application rate without bubbles.

In order to lessen these restrictions, the hotmelt process was developed. In this process, the PSA is applied to the backing material from the melt. Acrylic hotmelt applications are already known and were described a long time ago [NL 6 606 711 and NL 7 009 629].

This new technology is also hampered by restrictions, however. Prior to coating, the solvent is removed from the PSA in a drying extruder. The drying process involves a relatively high temperature and shearing effect, so that high molecular mass polyacrylate PSAs in particular are heavily damaged. The acrylic PSA gels or the low molecular mass fraction is greatly increased as a result of molecular weight breakdown. Both effects are unwanted. Either it is no longer possible to apply the adhesive or there are changes in the technical properties of the PSA, since in the shear test, for example, the low molecular mass fractions act as lubricants and so lead to premature failure of the adhesive. Nor is it possible to compensate for this by efficient crosslinking. In principle, acrylic hotmelts can be crosslinked by UV light or even higher-energy radiation, such as electron beams, for example. Both methods carry certain disadvantages. Owing to the intrinsic absorption of the polyacrylates, UV light is only able to penetrate the PSA to a maximum of about 100 $\mu$m. Since the hotmelt technology has advantages specifically for PSA tapes coated at particularly high application rates, this results in a particular disadvantage. This effect is exacerbated, furthermore, by resins frequently added to polyacrylate PSAs in order to increase the bond strength. Electron beam crosslinking, on the other hand, has different disadvantages. Besides the significantly higher cost of the apparatus, EB irradiation, which is not very selective, requires polyacrylates of high average molecular weight, which again crosslink randomly. For the EB crosslinking of low molecular mass acrylic PSAs, on the other hand, very high doses are required, which lead, however, to very close-meshed networks with varnish properties. A further disadvantage are fragments formed by cleavage of the ester side chains under the high-energy radiation. Volatile fragments of this kind may lead to unpleasant odor pollution originating from the PSA tape.

The thermal crosslinking of acrylic hotmelts, on the other hand, is significantly more difficult and is hampered by problems, since the majority of crosslinking reagents react during the actual hotmelt process, with the consequence that the PSAs gel prior to coating. In the patent DE 195 24 250 A1, isocyanates are used for the thermal crosslinking of acrylic hotmelts. Owing to their high concentration of functionality, however, these compounds are very reactive and are difficult to incorporate and stabilize in the hotmelt process. Isocyanate-functionalized particles, on the other hand, have a relatively small number of reactive groups and have steric hindrances, with the consequence of significantly lower reactivity and therefore a longer pot life in the hotmelt process. Furthermore, the technical properties of the acrylic PSA may be influenced positively with respect, for example, to cohesion by the choice of particle substrate.

Particles are admixed very frequently in acrylic PSAs. It is possible, for example, to use heat-expandable microparticles [U.S. Pat. No. 5,441,810] which expand following temperature exposure and allow more easy removal from the substrate. These particles, however, do not contribute to crosslinking the PSA. In addition, many particles find use as tacky additive components [U.S. Pat. No. 3,857,731]. They are prepared, for example, according to Bohnel [U.S. Pat. No. 4,166,152] in an emulsions polymerization process. Tacky microparticles have also been used for PSA applications [U.S. Pat. No. 4,810,763]. For repositionable PSA surfaces, microbeads of PMMA and polyacrylic acid have been used [U.S. Pat. No. 4,735,837]. In order to obtain optimum repositionability, the proportions of the beads to the PSA were varied. In no process were beads or particles used in order to crosslink acrylic hotmelt PSAs.

In conjunction with a hotmelt process, tacky particles were added to hotmelt adhesives [U.S. Pat. No. 4,049,483]. In addition to polymer particles, however, it is also possible to use glass beads in adhesives [U.S. Pat. No. 4,223,067].

Functionalized particles are used, on the other hand, in combinatorial chemistry and biochemistry; by way of example, mention may be made here merely of the patents U.S. Pat. No. 6,168,913 and the references and patents cited therein, and also patents U.S. Pat. Nos. 6,147,159 and 6,114,493.

It is an object of the invention to provide an improved process for preparing acrylic PSAs and a suitable starting material therefor.

It has now been discovered, surprisingly for the skilled worker, that particles of the kind specially developed for combinatorial chemistry are outstandingly suitable for the thermal crosslinking of acrylic hotmelts and in addition to the thermal crosslinking bring about an increase in the cohesive properties by virtue of their particle structure.

The invention accordingly provides pressure sensitively adhesive polyacrylates according to a composition known per se, to which there have been added crosslinked and functionalized polymer particles which on the basis of their chemical nature are suitable for assisting a crosslinking reaction of the polyacrylates and thus for serving to prepare pressure sensitive adhesives.

For this purpose preference is given to using pressure sensitively adhesive polyacrylates obtainable by free radical polymerization of a monomer mixture comprising at least the following components:

(a) from 60 to 99% by weight of acrylic acid and methacrylic acid derivatives of the formula $$CH_2=CH(R_1)(COOR_2) \quad (I)$$

where $R_1$ is H or $CH_3$ and $R_2$ is an alkyl chain having from 1 to 20 carbon atoms (b) from 1 to 10% by weight of vinyl, acrylic and/or methacrylate monomers containing a group X capable of chemical coupling by a process known per se.

The polymer particles contain at least two functional groups, Y and Z, which are capable of chemical coupling with the functional group X in the form of a substitution or addition reaction. In this context, the term "chemical coupling" embraces in particular addition reactions and substitution reactions (especially esterification and transesterification reactions), in which substitution reactions whole groups or parts may be eliminated.

Compounds used as monomers for component (b) are compounds which carry at least one functional group X capable of chemical coupling with the polymer particles in the sense of substitution and/or addition reactions with the groups Y and/or Z. In the case where thermal energy is applied, these reactions promote crosslinking of the PSA. For effective crosslinking the polymer particles may advantageously also contain more than two functional groups which are able to react with the groups X; by this means it is possible to reduce the amount of polymer particles added for the purpose of achieving a desired degree of crosslinking. Outstanding examples of such groups X include carboxylic acid groups, hydroxy groups, amines, amides, isocyanates, imides, aldehydes, and thiols, without wishing to impose any unnecessary restriction by providing this list. By way of example, a number of compounds may be mentioned: N-vinylformamide, vinylpyridines, acrylic acid, hydroxyethyl acrylate, and hydroxyethyl methacrylate.

For one preferred embodiment of the pressure sensitively adhesive polyacrylates of the invention the monomer mixture comprises as a further component (c) up to 30% by weight of vinyl compounds containing functional groups, such as styrene, styrene derivatives, vinyl acetate, etc.

Particularly suitable for this purpose are one or more vinyl compounds selected from the following group:

vinyl esters, vinyl halides, vinylidene halides, and nitriles of ethylenically unsaturated hydrocarbons.

Examples that may be mentioned here of such vinyl compounds include vinyl acetate, ethyl vinyl ether, vinyl chloride, vinylidene chloride, and acrylonitrile, without wishing to impose any unnecessary restriction by providing this list. It is also possible to use all other vinyl compounds which fall within the group set out above, and also all other vinyl compounds which do not fall within the classes of compound mentioned above.

The amount of polymer particles added is advantageously chosen such that their fraction in the polyacrylate/polymer particle mixture is up to 30% by weight, preferably up to 25% by weight, more preferably up to 10% by weight, very preferably up to 5% by weight. By way of the amount of polymer particles added it is possible to adjust the desired degree of crosslinking and thus the hardness and the tack of the resultant crosslinked PSA.

The polymer particles with functionalities possessing crosslinking capability may be selected in principle from the group of all crosslinked polymer particles containing such functional groups. The particles may be present in asymmetric or symmetric form, especially in bead form. The size of the particles should be below the film thickness of the subsequent acrylic PSA when it is being applied to a backing. In particular cases it may be of advantage to use larger particles in order, for example, to produce repositionable PSA tapes.

Preference is given to using polymer particles having a size of from 1 to 500 μm, more preferably from 50 to 200 μm, very preferably from 75 to 150 μm.

In the case of substantially spherical particles, "size" means the diameter of the particles; in the case of nonspherical or asymmetric particles, it relates to the length over the longest extent of the particles—in the case of rod-shaped particles, for example, it is thus the length of the longitudinal axis. The sizes are preferably chosen on condition that they do not exceed the film thickness of the PSA when subsequently coated onto a backing material.

Where the polyacrylates provided with the polymer particles can be oriented before, during or after coating, by means of appropriate techniques, in such a way that the alignment of the particles in the film exhibit a preferential direction, the size of the particles may also be chosen such that it exceeds the film thickness of the PSA without the particles protruding from the film and having disruptive effects with regard to a homogeneous or smooth coated appearance.

Examples of functional groups Y and Z which can be selected include, independently of one another, hydrazines, amines, phenols, tosyl chlorides, isocyanates, aldehydes, carbonates, phosphines, carbodiimides, N-methylmorpholines, oxazolidine or sulfonic acid groups, without wishing to be restricted by this listing.

For hotmelt pressure sensitive adhesives it may be of particular advantage to use blocked isocyanate functional groups. U.S. Pat. No. 5,510,443 describes a number of variants for the blocking of isocyanate groups. Blocked isocyanates are functional groups which under the influence of temperature form isocyanate groups and so initiate a reaction.

The coupling reactions between the functional groups X of the polyacrylates and the functional groups Y and Z, respectively, of the polymer particles may in particular represent both addition reactions and substitution reactions.

The following reactions may be mentioned in particular in this context; however, the list is not conclusive and is merely intended to illustrate the invention by way of a number of exemplary coupling reactions:

| Group X on polyacrylate side | Group Y and Z, respectively, in polymer particles | Type of reaction |
| --- | --- | --- |
| anhydride- | hydroxy-, alkoxy-, mercapto-, thioether-, isocyanate-, amino-, oxazole-, ... | addition |
| acid- | hydroxy- | esterifications and |
| ester- | amino- | transesterifications (substitution) |
| hydroxy- acid- | isocyanate- | addition |

It should be pointed out here that the groups defined above as Y and Z, respectively, may also be present in the sense of groups X in the polyacrylate and in that case the functional groups defined above as X serve accordingly as groups Y and Z, respectively, of the polymer particles. In that case the comments made with regard to these groups apply the other way round.

The particles are composed of polymers which may have very different static glass transition temperatures. Polymers having a static glass transition temperature of less than 25° C. may have tacky properties at room temperature and may therefore influence the technical properties. Very great preference, however, is given to using polymers having a glass transition temperature of more than 25° C. Examples thereof are beads of PMMA (polymethyl methacrylate) or polystyrene. These beads are prepared, for example, by emulsion polymerization and are crosslinked.

In another preferred example, resins from the company Argonaut Technologies are used. These resins may contain, for example, hydrazine, amine, phenol, tosyl chloride, isocyanate, aldehyde, carbonate, phosphine, carbodiimide, N-methylmorpholine, oxazolidine or sulfonic acid functional groups, without wishing to be restricted by this listing. In one very preferred embodiment for the PSA of the invention the PS-Isocyanate™ Resins (from Argonaut Technologies) are used.

Additionally, in accordance with the invention a process for preparing a crosslinked pressure sensitive adhesive based on polyacrylates is claimed wherein a polyacrylate is prepared by free radical polymerization of a monomer mixture comprising at least the following components
(a) from 60 to 99% by weight of acrylic acid and methacrylic acid derivatives of formula

$$CH_2=CH(R_1)(COOR_2) \qquad (I)$$

where $R_1$ is H or $CH_3$ and $R_2$ is an alkyl chain having from 2 to 20 carbon atoms
(b) from 1 to 10% by weight of vinyl, acrylic and/or methacrylate monomers having a group X capable of chemical coupling,
by a process known per se, so that the polyacrylate contains free groups X, the pressure sensitive adhesive is concentrated to a melt having a solvent content <2% by weight,
the pressure sensitive adhesive is blended in the melt with crosslinked and functionalized polymer particles below a critical reaction temperature T in a rheometer-extruder, the polymer particles containing at least two functional groups Y and Z which are capable of chemical coupling with the functional group X in the form of a substitution or addition reaction,
a crosslinking reaction is carried out by bringing the temperature of the adhesive to at least the critical reaction temperature T so that the coupling reaction between the functional group X of the polyacrylate and the functional groups Y and Z of the polymer particles is obtained.

Outstandingly suitable for use in the inventive process as functional groups X and/or as functional groups Y and/or Z are blocked isocyanate groups.

The preferred use of the process is therefore for preparing crosslinked pressure sensitive adhesives by way of the polyacrylates of the invention provided with polymer particles. The cohesion of the pressure sensitive adhesive is modified by the crosslinking and, where polymer particles having a high glass transition temperature are used, the viscoelastic properties are modified by incorporation of the polymer particles.

It is possible here with advantage, accordingly, to add component (c) to the monomer mixture.

For the monomer mixture, the components (a), (b), and (c) and also the groups X, Y, and Z, the comments already made above apply correspondingly and also the details given concerning the polymer particles.

The critical temperature T is defined such that below the critical temperature (in the hotmelt process) reaction between the groups X and the groups Y and Z does not occur (or the equilibrium of the coupling reaction lies on the side of the reactants); above the critical temperature, however, a reaction takes place at a rate sufficient to lead to adequate crosslinking of the polyacrylates. Accordingly, in other words, the critical temperature can correspond substantially to the activation energy of the coupling reaction.

For the polymerization the monomers are chosen such that the resulting polyacrylates can be used as industrial pressure sensitive adhesives, particularly such that the resultant polyacrylates possess pressure sensitive adhesive properties in accordance with the Handbook of Pressure Sensitive Adhesive Technology by Donatas Satas (van Nostrand, New York 1989). For these applications the static glass transition temperature of the resultant polyacrylate will advantageously be situated below 25° C.

The polymerization may be conducted in the presence of one or more organic solvents and/or in the presence of water. In one advantageous embodiment of the process, additional cosolvents or surfactants, such as glycols or ammonium salts of fatty acids, are present. Preferred processes use as little solvent as possible. Suitable organic solvents or solvent mixtures are pure alkanes (hexane, heptane, octane, isooctane), aromatic hydrocarbons (benzene, toluene, xylene), esters (ethyl, propyl, butyl or hexyl acetate), halogenated hydrocarbons (chlorobenzene), alkanols (methanol, ethanol, ethylene glycol, ethylene glycol monomethyl ether), and ethers (diethyl ether, dibutyl ether) or mixtures thereof. A water-miscible or hydrophilic cosolvent may be added to the aqueous polymerization reactions in order to ensure that in the course of monomer conversion the reaction mixture is present in the form of a homogeneous phase. Cosolvents which can be used with advantage for the present invention are chosen from the following group, consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulfides, sulfoxides, sulfones, alcohol derivatives, hydroxyether derivatives, amino alcohols, ketones, and the like, and also derivatives and mixtures thereof.

The polyacrylates prepared preferably have an average molecular weight $M_w$ (weight average) of from 100 000 to 1 200 000 g/mol, more preferably between 250 000 and 400 000 g/mol. The average molecular weight $M_w$ is determined by size exclusion chromatography (gel permeation chromatography, GPC) or matrix assisted laser desorption/ionization mass spectrometry (MALDI-MS).

Thereafter, the solvent is removed from the polymer and the polyacrylate composition is further processed preferably as an acrylic hotmelt.

For this purpose the polyacrylates prepared as described in the aforegoing text are concentrated to a polyacrylate position whose solvent content is ≦2% by weight. This process takes place preferably in a concentrating extruder.

Alternatively, the pressure sensitively adhesive polyacrylate may be further processed from solution.

The mixing of the functionalized polymer particles takes place as a function of the viscosity of the acrylic hotmelt. Besides dynamic mixers it is also possible, for example, to use extruders, such as twin screw extruders for example. Kneading devices may also be used. In general, the shear rate should be as low as possible, so that the polymer particles are not destroyed under shear. The added polymer particles may also serve as processing auxiliaries in the hotmelt process. In the manner of a ballbearing effect, the flow viscosity of the acrylic hotmelt being processed would be reduced and thus the damaging shear would be lessened.

Moreover, the acrylic PSA can also be dispersed in solution with the functionalized polymer particles.

For their use as pressure sensitive adhesives (PSAs), the polyacrylates prepared in accordance with the inventive process are optimized by optional blending with at least one resin. Admixing of the resin or resins may take place before or after admixing of the functionalized polymer particles. As tackifying resins to be added it is possible without exception to use all tackifier resins which are already known and described in the literature.

By way of representation, mention may be made of pinene resins, indene resins, and rosins, their disproportionated, hydrogenated, polymerized, and esterified derivatives and salts, the aliphatic and aromatic hydrocarbon resins, terpene resins and terpene phenolic resins, and also C5, C9, and other hydrocarbon resins. Desired combinations of these and other resins may be used in order to adjust the properties of the resultant adhesive in accordance with what is required. In general it is possible to use any resins which are compatible (soluble) with the corresponding polyacrylate; in particular, reference may be made to all aliphatic, aromatic, and alkylaromatic hydrocarbon resins, hydrocarbon resins based on pure monomers, hydrogenated hydrocarbon resins, functional hydrocarbon resins, and natural resins. Express reference may be made to the outline of the state of the art given in the Handbook of Pressure Sensitive Adhesive Technology by Donatas Satas (van Nostrand, 1989).

In a further advantageous development, one or more plasticizers, such as low molecular mass polyacrylates, phthalates, whale oil plasticizers or plasticizer resins, for example, are added to the pressure sensitive adhesive.

The acrylic hotmelts may further be blended with one or more additives such as aging inhibitors, light stabilizers, ozone protectants, fatty acids, resins, nucleators, blowing agents, compounding agents and/or accelerators.

Examples of suitable accelerators include substances which are able to accelerate the thermal crosslinking with assistance of the polymer particles. Depending on reaction, Lewis or Brönsted acids or Lewis or Brönsted bases may be suitable here. These compounds may also, where appropriate, be generated in situ by UV radiation.

The PSAs may further be admixed with additional fillers such as fibers, carbon black, zinc oxide, titanium dioxide, solid or hollow glass (micro) beads, microbeads of other materials, silica, silicates, and chalk.

In addition it is possible with advantage to add substances which crosslink under radiation, such as difunctional or polyfunctional acrylates or difunctional or polyfunctional urethane acrylates, difunctional or polyfunctional isocyanates or difunctional or polyfunctional epoxides, for example. Use may also be made here, however, of all other difunctional or polyfunctional compounds which are familiar to the skilled worker and are capable of crosslinking polyacrylates. Suitable photoinitiators include preferably Norrish type I and type II cleavers, possible examples of both classes being benzophenone, acetophenone, benzil, benzoin, hydroxyalkylphenone, phenyl cyclohexyl ketone, anthraquinone, thioxanthone, triazine, or fluorenone derivatives: a list which makes no claim to completeness.

Particularly for use as a pressure sensitive adhesive it is of advantage for the inventive process if the polyacrylate is applied preferentially from the melt as a film on a backing or on a backing material.

In general, coating by means of a nozzle or by means of a roller should take place as shortly as possible after the admixing of the functionalized polymer particles, in order to prevent instances of crosslinking or gelling during the hotmelt process.

Alternatively, the acrylic PSA provided with the polymer particles capable of thermal crosslinking may be applied conventionally from solution using a coating bar or as a high solids adhesive by way of a nozzle, followed by evaporation of the solvent.

Backing materials used for the PSA, for adhesive tapes for example, are the materials which are customary and familiar to the skilled worker, such as films (polyesters, PET, PE, PP, BOPP, PVC), nonwovens, foams, wovens and woven sheets, and also release paper (glassine, HDPE, LDPE). This list is not conclusive.

A further development of the process of the invention is the thermal crosslinking through the functionalized polymer particles. It is of particular advantage here that, following thermal crosslinking, the PSA tape may be heated again in a heating duct or heating tunnel. The temperatures here should be above the activation temperature needed for thermal crosslinking of the abovementioned polymer particles. In one very preferred configuration, the temperature is above 100° C.; in one exceptionally preferred configuration, it is above 140° C. The temperature to be applied may be limited by the backing material of the PSA tape. In general, instances of thermal decomposition to the backing material are to be avoided.

Further, it is possible with advantage to perform UV crosslinking by means of brief ultraviolet exposure within a wavelength range from 200 to 400 nm, in particular using high or medium pressure mercury lamps with an output of from 80 to 240 W/cm.

Also claimed is the use of the polyacrylate prepared by the inventive process as a pressure sensitive adhesive.

Particularly advantageous is the use of the polyacrylate pressure sensitive adhesive, prepared as described, for an adhesive tape, with the polyacrylate pressure sensitive adhesive applied to one or both sides of a backing.

In general, crosslinking results in an increase in the cohesion of the PSA tape. Accordingly, the PSA tapes produced by the inventive process can be used for industrial applications involving high temperatures or high shearing loads.

Additionally, through appropriate choice of the polymer particles, it is possible to produce repositionable PSA tapes. This applies in particular to PSA tapes with a film thickness which lies below the particle sizes or bead sizes that are used.

Furthermore, through the appropriate choice of the polymer particles, it is possible to strengthen the bonding of the PSA tapes. This can be achieved, for example, by means of beads which possess a static glass transition temperature well below 25° C.

It is possible, furthermore, to produce heat activatable PSA tapes. This applies to PSA tapes which possess no initial tack and bond strength at room temperature and elevated temperatures. By adding polymer particles which suddenly become tacky at a certain elevated temperature, the tacky crosslinking beads in the otherwise nontacky matrix produce a bond strength which allows the product to be used as a pressure sensitive adhesive tape.

By adding the polymer particles it is also possible to produce PSA tapes possessing improved cutting and punching properties.

EXAMPLES

Test Methods

The following test methods were employed to evaluate both the technical adhesive properties and the general properties of the pressure sensitive adhesives prepared.

180° Bond Strength Test (Test A)

A 20 mm wide strip of an acrylic PSA applied as a film to polyester was applied to steel plates. The PSA strip was pressed onto the substrate twice using a 2 kg weight. The adhesive tape was then immediately peeled from the substrate at 300 mm/min at an angle of 180°. The steel plates had been washed twice with acetone and once with isopropanol. The results are reported in N/cm and are averaged over three measurements. All measurements were conducted at room temperature.

Shear Strength (Test B1; B2)

A 13 mm wide strip of the adhesive tape was applied to a smooth steel surface which had been cleaned three times with acetone and once with isopropanol. The application area was 20 mm★13 mm (length★width). The adhesive tape was then pressed onto the steel support four times using an applied pressure of 2 kg. At 80° C. a 1 kg weight was fastened to the adhesive tape (B1), at room temperature a 2 kg weight (B2). The measured shear stability times are reported in minutes and correspond to the average of three measurements.

Gel Permeation Chromatography GPC (Test C)

The average molecular weight, $M_w$, and the polydispersity, PD, were determined by gel permeation chromatography. The mobile phase used was THF containing 0.1% by volume trifluoroacetic acid. The measurement was conducted at 25° C. As a precolumn, PSS-SDV, 5 µ, $10^3$ Å, ID 8.0 mm×50 mm was used. For separation, the columns PSS-SDV, 5 µ, $10^3$ and also $10^5$ and $10^6$ each of ID 8.0 mm×300 mm were used. The sample concentration was 4 g/l, and the flow rate 1.0 ml per minute. Measurement was made against PMMA standards.

Carrying Out the Hotmelt Process in a Measuring Mixer (Method D):

The acrylic hotmelts were mixed with the particles in a Rheomix 610 p measuring mixer from Haake. The drive unit available was the Rheocord RC 300 p unit. The unit was controlled using the PolyLab System software. The mixer was charged in each case with 52 g of solvent-free acrylic PSA (~80% fill level) and, where appropriate, with the amounts of resins from Argonaut Technologies described in the examples. The experiments were conducted at a mixing temperature of 100° C., a rotational speed of 40 rpm, and a mixing time of 30 seconds. Thereafter, on a hotmelt coater with two heatable rolls, the samples were applied at a rate of 150 g/m² to a Saran-primed PET film 23 µm thick, heated for 15 minutes at 130° C. in a drying oven, and then tested for their technical adhesive properties in accordance with test methods A and B1/B2.

Polymer Beads

As functionalized polymer beads, the PS-Isocyanate Resins™ polymers from Argonaut Technologies were used. These resins are 1% crosslinked, possess a functionality of from 1.0 to 1.7 mmol/g polymer, and have a size of from 75 to 150 microns.

Example 1a and 1b

A 200 L reactor conventional for free radical polymerizations was charged with 5 kg of acrylic acid, 45.0 kg of 2-ethylhexyl acrylate and 30 kg of 1:1 acetone/special boiling point spirit 60/95. After nitrogen gas had been passed through the reactor for 45 minutes with stirring, the reactor was heated to 58° C. and 20 g of 2,2'-azoisobutyronitrile (AIBN) were added. The external heating bath was then heated to 75° C. and the reaction was carried out constantly at this external temperature. After a reaction time of 1 h a further 20 g of AIBN were added. After 2.5 h and 5 h, the reaction mixture was diluted in each case with 15 kg of 1:1 acetone/special boiling point spirit 60/95. After a reaction time of 48 h the reaction was terminated and the reaction mixture cooled to room temperature. Subsequently, one portion of the pressure sensitive adhesive was concentrated to a hotmelt in a vacuum drying oven at 10 torr and 50° C. for 24 h.

For example 1a, the pure hotmelt without addition of resins was processed further to a PSA tape by method D.

For example 1b, 2 g of the resin PS-Isocyanate™ from Argonaut Technologies were mixed in after method D, after which processing to the PSA tape continued.

Example 2a, 2b, and 2c

Preparation was as in example 1. Polymerization was carried out using 5 kg of acrylic acid, 45 kg of n-butyl acrylate and 30 kg of 1:1 acetone/special boiling point spirit 60/95. Subsequently, the identical amounts of solvent and initiator as stated in example 1 were used. Following the concentration process, the procedure was as in example 1.

For example 2a, the pure hotmelt without addition of resins was processed further to the PSA tape by method D.

For example 2b, 2 g of the resin PS-Isocyanate™ from Argonaut Technologies were mixed in after method D, after which processing to the PSA tape continued.

For example 2c, 3 g of the resin PS-Isocyanate™ from Argonaut Technologies were mixed in after method D, after which processing to the PSA tape continued.

Example 3a, 3b, and 3c

Preparation was as in example 1. Polymerization was carried out using 1 kg of acrylic acid, 24.5 kg of 2-ethylhexyl acrylate, 24.5 kg of n-butyl acrylate and 30 kg of 1:1 acetone/special boiling point spirit 60/95. Subsequently, the identical amounts of solvent and initiator as stated in example 1 were used. Following the concentration process, the procedure was as in example 1.

For example 3a, the pure hotmelt without addition of resins was processed further to the PSA tape by method D.

For example 3b, 2 g of the resin PS-Isocyanate™ from Argonaut Technologies were mixed in after method D, after which processing to the PSA tape continued.

For example 3c, 4 g of the resin PS-Isocyanate™ from Argonaut Technologies were mixed in after method D, after which processing to the PSA tape continued.

Results

Subject matter of the invention is a polyacrylate with addition of functionalized polymer particles, a process for preparing acrylic pressure sensitive adhesives with the aid of such polyacrylates, and the use of the resultant pressure sensitive adhesive for acrylic pressure sensitive adhesive tapes. A polyacrylate composition is blended with functionalized, nontacky, crosslinked, and spherical particles, applied as a pressure sensitive adhesive to one or more backing materials, after which a crosslinking reaction is initiated by thermal or UV activation. As a result of the crosslinking the cohesion of the pressure sensitive adhesive is increased and hence also that of the corresponding pressure sensitive adhesive tape. Additionally, the cutting properties of high-tack pressure sensitive adhesives is improved by this process.

Examples 1a, 2a, and 3a serve for reference and illustrate the fact that the uncrosslinked specimens possess virtually no shear strength (see table 1). Through the addition of the PS-Resins™, on the other hand, a marked improvement is obtained. These resins can easily be incorporated under hot conditions by a kneading process without gelling of the PSA. After coating, the isocyanate groups of the PS-Resins™ can be induced to react by subsequent heat treatment at relatively high temperatures, with onset of marked crosslinking. Table 1 indicates that this is manifested in a drastic increase in the shear stability times.

TABLE 1

| Example | SST (80° C., 10 N) Test B1 | SST (RT, 20 N) Test B2 | BS steel [N/cm] Test A |
|---|---|---|---|
| 1a | <5 | <5 | 8.2 |
| 1b | +10 000 | 3 570 | 6.8 |
| 2a | <5 | <5 | 8.8 |
| 2b | +10 000 | 6 495 | 6.6 |
| 2c | +10 000 | +10 000 | 5.9 |
| 3a | <5 | <5 | 9.5 |
| 3b | +10 000 | +2 535 | 7.1 |
| 3c | +10 000 | +4 270 | 6.3 |

SST: Shear stability times
RT: Room temperature
BS: Bond strength

The shear stability times increase from less than 5 minutes under a shearing force of 10 N at 80° C. (Test B1) to well over 10 000 minutes for all of the examples. Even with a shearing force of 20 N at room temperature (Test B2) an improvement from less than 5 minutes to more than 10 000 minutes (example 2c) is evident. Accordingly, even acrylic hotmelts can be thermally crosslinked reliably in an extrusion process, with improvements in properties being achieved as well. The bond strength to steel (Test A), on the other hand, decreases markedly with increasing shear strength, which can easily be explained in turn by way of the altered viscoelastic properties.

We claim:

1. A pressure sensitively adhesive composition comprising:
    i) A pressure sensitively adhesive polyacrylate having functional groups, and
    ii) crosslinked polymer particles having functional groups,
wherein the functional groups of the particles are capable of coupling with the functional groups of the polyacrylate adhesive, said polyacrylate being formed from a monomer mixture comprising at least the following components:
    (a) from 60 to 99% by weight of one or more monomers selected from the group consisting of acrylic acid derivatives and methacrylic acid derivatives of the formula $$CH_2=CH(R_1)(COOR_2) \tag{I}$$

where $R_1$ is H or $CH_3$ and $R_2$ is an alkyl chain having from 1 to 20 carbon atoms, (b) from 1 to 10% by weight of one or more monomers selected from the group consisting of vinyl monomers, acrylic monomers, and methacrylate monomers, containing a group X capable of chemical coupling,
    and said polymer particles containing at feast two functional groups Y, and Z, which are capable of chemical coupling with the functional group X in the form of a substitution or addition reaction.

2. The pressure sensitively adhesive composition of claim 1, wherein said particles comprise up to 30% by weight of the total amount of said particles and said polyacrylate.

3. The pressure sensitive adhesive composition of claim 2, wherein said particles comprise up to 25% by weight of the total amount of said polymer particles and said polyacrylate.

4. The pressure sensitive adhesive composition of claim 3, wherein said particles comprise up to 5% by weight of the total amount of said polymer particles and said polyacrylate.

5. The pressure sensitively adhesive composition as claimed in claim 1, wherein the polymer particles have a size of from 10 to 500 µm.

6. The pressure sensitively adhesive composition of claim 5, wherein said particle size is from 50 µm to 200 µm.

7. The pressure sensitively adhesive composition of claim 6, wherein said particle size is from 75 µm to 150 µm.

8. The pressure sensitively adhesive composition as claimed in claim 1, wherein said monomer mixture further comprises:
    (c) up to 30% by weight of vinyl compounds containing functional groups.

9. The pressure sensitively adhesive composition of claim 8, wherein said vinyl compounds (c) are selected from the group consisting of styrene, styrene derivatives and vinyl acetate.

10. The pressure sensitively adhesive composition as claimed in claim 1, wherein said polymer particles comprise polymethylmethacrylate particles, polystyrene particles or both.

11. The pressure sensitively adhesive composition as claimed in claim 1, wherein the functional groups Y and Z of the polymer particles are selected independently of one another from the group consisting of:
    hydrazines, amines, phenols, tosyl chlorides, isocyanates, aldehydes, carbonates, phosphines, carbodiimides, N-methylmorpholines, oxazolidines, and sulfonic acid groups.

12. The pressure sensitive adhesive composition of claim 1, wherein said polyacrylate is formed by free radical polymerization of said monomer mixture.

13. A process for preparing a crosslinked pressure sensitive adhesive based on polyacrylates, wherein
    a polyacrylate is prepared by free radical polymerization of a monomer mixture comprising at least the following components:
    (a) from 60 to 99% by weight of acrylic acid and methacrylic acid derivatives of formula $$CH_2=CH(R_1)(COOR_2) \tag{I}$$

where $R_1$ is H or $CH_3$ and $R_2$ is an alkyl chain having from 2 to 20 carbon atoms (b) from 1 to 10% by weight of vinyl, acrylic or methacrylate monomers, or a combination thereof, having a group X capable of chemical coupling, so that the polyacrylate contains free groups X, the pressure sensitive adhesive is concentrated to a melt having a solvent content <2% by weight, the pressure sensitive adhesive is blended in the melt with crosslinked and functionalized polymer particles at a temperature below a critical reaction temperature T in a measuring mixer, the polymer particles containing at least two functional groups Y and Z which are capable of chemical coupling with the functional group X by a substitution or addition reaction, a crosslinking reaction is carried out by bringing the temperature of the blend to at least the critical reaction temperature T, at which the coupling reaction between the functional group X of the polyacrylate and the functional groups Y and Z of the polymer particles takes place.

14. The process as claimed in claim 13, wherine the blend is applied from the melt to a backing material prior to the crosslinking reaction.

15. A pressure sensitive single-sided or double-sided adhesive tape prepared by the process of claim 14.

16. The process of claim 13, wherein X, Y or Z, or any combination of them, are blocked isocyanate groups.

* * * * *